R. M. AHRENS.
SAW FRAME.
APPLICATION FILED APR. 7, 1911.
1,055,592.
Patented Mar. 11, 1913.
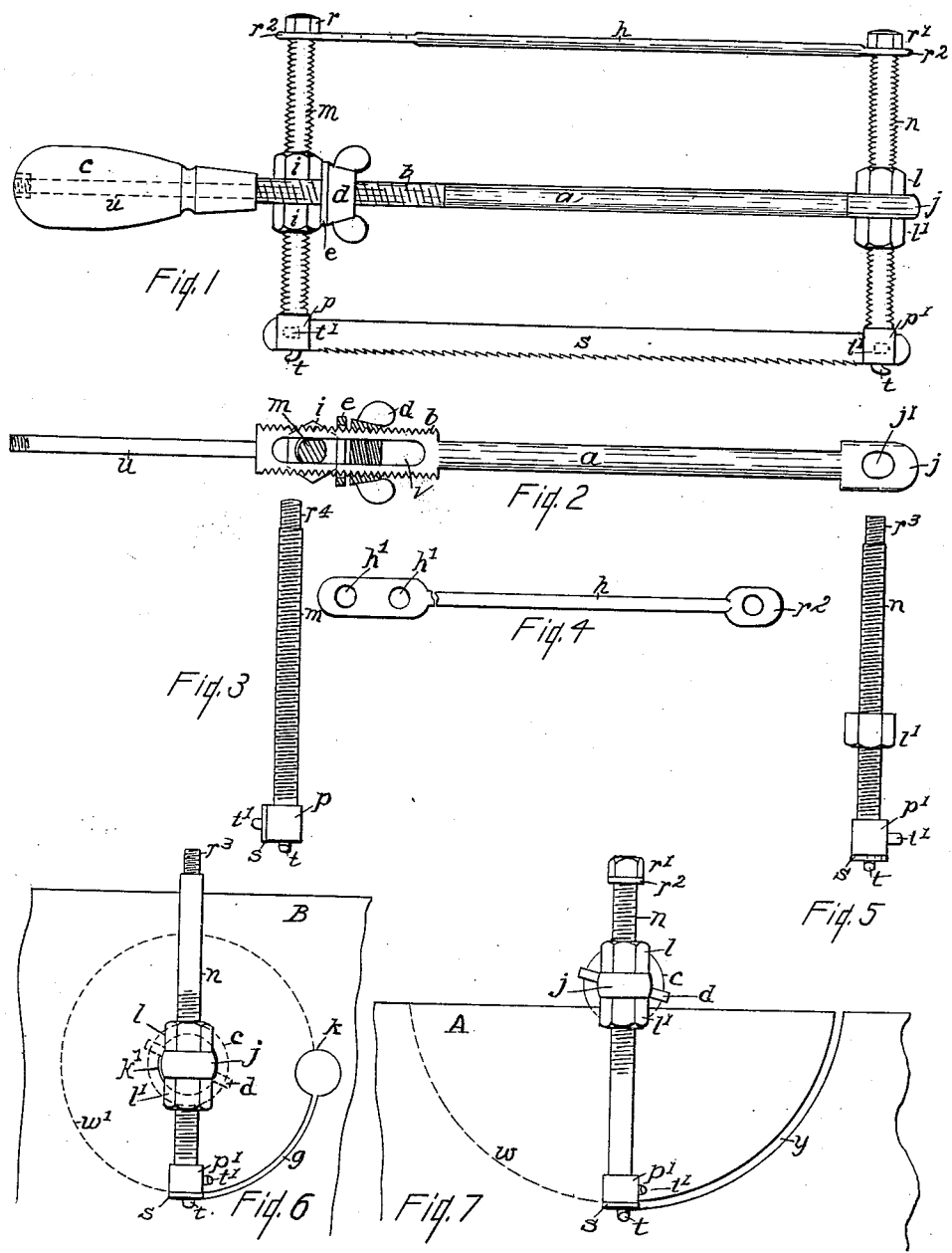

UNITED STATES PATENT OFFICE.

RICHARD M. AHRENS, OF PEEKSKILL, NEW YORK.

SAW-FRAME.

1,055,592.   Specification of Letters Patent.   Patented Mar. 11, 1913.

Application filed April 7, 1911. Serial No. 619,471.

*To all whom it may concern:*

Be it known that I, RICHARD M. AHRENS, a citizen of the United States, and resident of Peekskill, in the county of Westchester and State of New York, have invented certain new and useful Improvements in Saw-Frames, of which the following is a specification.

This invention relates to saw frames, and particularly to frames for hack saws, although it is applicable to wood cutting scroll saw frames.

It has for its object a frame more adaptable to a variety of work than are the saw frames now obtainable.

The object is accomplished by the means described in this specification and the accompanying drawings, in which like letters refer to like parts throughout the several views.

Figure 1 is a side elevation of the saw frame. Fig. 2 is a plan of the handle-bar of the saw frame, with other parts in cross section. Fig. 3 is an edge plan of one of the adjustable saw-bars. Fig. 4 shows a part of a brace bar. Fig. 5 is an edge plan of one of the adjustable saw-bars, carrying an adjusting nut. Fig. 6 illustrates the use of the saw for cutting holes. Fig. 7 illustrates the saw as used for cutting a half circle.

As shown in Figs. 1 and 2 the handle bar $a$ is made from a round rod, of a diameter equal to the width of the part $b$ Fig. 2. The bar is reduced in diameter between the parts $b$ and $j$, and the sides of the parts $b$ and $j$ are flattened to a width the diameter of the reduced part of the rod. Before flattening the part $b$ is provided with a screw thread to receive the wing nut $d$. The saw-bars $m$ $n$ are threaded to receive the nuts $i$ $i$ $l$ $l^1$, and are flattened on opposite sides. The perforation $j^1$, Fig. 2 is elongated and is made so the bar $n$ will have in it a sliding fit. The slot $v$ in the part $b$ receives the bar $m$, as in cross section in Fig. 2. The saw-bars $m$ $n$ each have square heads $p$ $p^1$, and hook-pins $t$ $t^1$ inserted therein, one set in the sides of the heads and one set in the ends of the heads, as particularly shown in Figs. 3 and 5. The ends of the bars $m$ $n$ opposite to the heads are reduced as at $r^3$ $r^4$, Figs. 3 and 5, to receive nuts $r$ $r^1$, Fig. 1.

The saw-bars are secured in the handle bar by the nuts $i$ $i$ on the bar $m$, and nuts $l$ $l^1$ on the bar $n$. By means of these nuts the saw-bars are laterally adjustable in the handle bar, and the bar $m$ is adjustable longitudinally of the slot $v$. An extension $u$ of the handle bar receives the handle $c$.

A saw $s$ is hung in the usual manner, upon hook-pins $t^1$ $t^1$ on the sides of the heads $p$ $p^1$, Fig. 1 and for the maximum length of saw the frame will carry, the saw is tightened by screwing down the nut $d$ against the nuts that clamp the bar $m$ in place in the bar $a$, as in Fig. 1. The nuts $i$ $i$ Fig. 1 are shown as octagon, and as hexagon in Fig. 2. Whichever they may be, the thickness of the part $b$ admits of the nuts closing against the handle bar so that the pressure of the nut $d$ will be upon flat sides of the nuts, as shown in Figs. 1 and 2. A washer $e$ is interposed between the wing nut and the saw-bar nuts.

The frame is adapted in its length and the length of the slot $v$ and the traverse of the wing nut $d$, to receive two or three lengths of saw blades. When a shorter than a maximum length of saw is used, a brace bar $h$ is employed to hook upon the ends $r^3$ $r^4$ of the saw-bars, as in Fig. 1. This bar is shown in plan in Fig. 4, with holes $h^1$ for varying lengths of saw blades.

In ordinary practice the adjustment of this saw frame would be about as shown in Fig. 1, with the distance between the saw blade and the handle bar corresponding to that of the ordinary saw frame. Often it is desirable to cut deeper into material than the commonly used saws will permit. In such cases with this saw frame the blade can be moved from the handle bar as far as the brace bar will permit.

By hanging the saw blade on the ends of the heads of the saw-bars, as in Figs. 5, 6, and 7, this saw frame can be used for cutting circles, as in Fig. 7; and when the handle bar is used as a center guide, the saw may be set any distance from the handle bar. In Fig. 7 A represents a piece to be cut upon the line $w$, the scarf made by the saw being shown at $y$.

In Fig. 6 is shown how round holes may be cut inside of a surface. A hole $k^1$ is made for the handle bar. The saw-bar $n$ is removed from the handle bar by unscrewing the nut $l$. The handle bar is projected through the hole $k^1$. Then the saw-bar is replaced, and the saw blade is hung by passing it through a hole $k$ bored in the material for it. The saw is shown to be cutting through the line $w^1$, the path of the saw being shown at $g$. Of course a mechanic would make the hole $k$ in a manner that would avoid leaving a part of it in the material as here shown.

Having described my invention, what I claim and desire to secure by patent of the United States, is—

The combination in a saw frame, comprising a handle bar, a handle on the bar, a slot for a saw-bar in the handle bar adjacent to the handle, a screw-thread on the bar above and over the said slot, a slot in the opposite end of the bar for a saw-bar, removable and adjustable saw-bars in the slots in the handle bar, the saw-bars provided with screw-threads and laterally adjustable in the slots in the handle bar, nuts on both saw-bars on each side of the handle bar for holding the saw-bars in lateral adjustment, a wing nut on the threaded part of the handle bar for applying tension to the saw, heads on the saw-bars for securing saws for straight and for scroll sawing, and a brace attachable to the saw bars at their ends opposite the saw holding heads on the saw-bars.

RICHARD M. AHRENS.

Witnesses:
J. E. BARTHELMES,
GUSSIE KNIFFEN.

Copies of this patent may be obtained for five cents each, by addressing the "Commissioner of Patents, Washington, D. C."